United States Patent
Ichikawa et al.

(10) Patent No.: US 10,017,041 B2
(45) Date of Patent: Jul. 10, 2018

(54) POWER TRANSMISSION STRUCTURE OF VEHICLE

(71) Applicant: TOYOTA JIDOSHA KABUSHIKI KAISHA, Toyota-shi, Aichi-ken (JP)

(72) Inventors: Akitaka Ichikawa, Nisshin (JP); Yoshimitsu Yokouchi, Okazaki (JP); Masataka Sugiyama, Toyota (JP); Haruo Isomura, Toyota (JP); Hiroki Kuwamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 15/137,713

(22) Filed: Apr. 25, 2016

(65) Prior Publication Data

US 2016/0311305 A1 Oct. 27, 2016

(30) Foreign Application Priority Data

Apr. 27, 2015 (JP) .................................. 2015-090876

(51) Int. Cl.
*B60K 6/26* (2007.10)
*B60K 6/365* (2007.10)
(Continued)

(52) U.S. Cl.
CPC ................ *B60K 6/365* (2013.01); *B60K 6/26* (2013.01); *B60K 6/445* (2013.01); *F16H 3/727* (2013.01);
(Continued)

(58) Field of Classification Search
CPC .......... B60K 6/365; B60K 6/26; B60K 6/445; F16H 57/0006; F16H 3/727;
(Continued)

(56) References Cited

U.S. PATENT DOCUMENTS

| | | | | |
|---|---|---|---|---|
| 3,373,625 A | * | 3/1968 | Keller | F16D 3/06 403/359.2 |
| 3,750,489 A | * | 8/1973 | Caldwell | F16D 1/06 74/434 |
| 6,322,407 B1 | * | 11/2001 | Onoue | B63H 20/20 440/52 |
| 6,854,556 B1 | * | 2/2005 | Yamamoto | B62D 5/043 180/443 |
| 7,175,555 B2 | | 2/2007 | Kozarekar et al. | |
| 2003/0183467 A1 | | 10/2003 | Kozarekar | |
| 2008/0043375 A1 | * | 2/2008 | Hanrahan | F16C 27/00 360/265.6 |
| 2008/0267693 A1 | * | 10/2008 | Court | F16C 11/045 403/14 |
| 2013/0283972 A1 | * | 10/2013 | Yamamoto | B60K 6/405 74/665 B |

(Continued)

FOREIGN PATENT DOCUMENTS

DE 202006020107 U1 12/2007
JP 2002-195386 A 7/2002
(Continued)

*Primary Examiner* — Roger L Pang
(74) *Attorney, Agent, or Firm* — Oliff PLC (57) ABSTRACT

A power transmission structure of a vehicle, which is provided with a first rotor, a second rotor, and a metallic cylinder. In this power transmission structure, the reduction shaft and the second rotor shaft receive reaction force from the cylindrical metallic member in radially opposite directions. The cylindrical metallic member is deformable elastically in a radial direction and press-fitted in a part where the reduction shaft and the second rotor shaft of a second electric motor overlap each other in the radial direction adjacent to a spline fitting part of the reduction shaft and the second rotor shaft. Therefore, misalignment between the axis of the reduction shaft and the axis of the second rotor shaft is restrained, and generation of tooth hitting sound is thus restrained. Since the cylindrical metallic member has high rigidity and is restrained from being deformed in a rotation direction, responsiveness of torque transmission is improved.

2 Claims, 9 Drawing Sheets

(51) Int. Cl.
*F16H 3/72* (2006.01)
*F16H 57/00* (2012.01)
*B60K 6/445* (2007.10)
*F16H 37/08* (2006.01)

(52) U.S. Cl.
CPC ...... *F16H 57/0006* (2013.01); *B60Y 2200/92* (2013.01); *B60Y 2306/09* (2013.01); *B60Y 2400/48* (2013.01); *B60Y 2400/604* (2013.01); *B60Y 2400/73* (2013.01); *F16H 3/724* (2013.01); *F16H 57/0025* (2013.01); *F16H 57/0037* (2013.01); *F16H 2037/0866* (2013.01); *F16H 2200/2007* (2013.01); *Y10S 903/906* (2013.01); *Y10S 903/911* (2013.01)

(58) Field of Classification Search
CPC ............. F16H 57/0025; F16H 57/0037; F16H 2037/0866; B60Y 2400/48; B60Y 2306/09; Y10S 9030/911; Y10S 903/911

USPC ................................................. 475/5; 74/440
See application file for complete search history.

(56) References Cited

U.S. PATENT DOCUMENTS

2015/0082929 A1\* 3/2015 Isomura .................. B60K 1/00
                                                                74/331
2017/0067512 A1\* 3/2017 Nakawatari ............... F16D 1/02

FOREIGN PATENT DOCUMENTS

| JP | 3898139 B2 | 3/2007 |
| JP | 2011-214646 A | 10/2011 |
| JP | 2012-219828 A | 11/2012 |
| JP | 2014-084930 A | 5/2014 |

\* cited by examiner

[RELATED ART]

[RELATED ART]

POWER TRANSMISSION STRUCTURE OF VEHICLE

INCORPORATION BY REFERENCE

The disclosure of Japanese Patent Application No. 2015-090876 filed on Apr. 27, 2015 including the specification, drawings and abstract is incorporated herein by reference in its entirety.

BACKGROUND OF THE INVENTION

1. Field of the Invention

The invention relates to a power transmission structure of a vehicle, and especially to a technology for restraining misalignment of axis between a first rotor and a second rotor connected with each other by spline-fitting, and for improving responsiveness of torque transmission between the first rotor and the second rotor.

2. Description of Related Art

Figure 13:
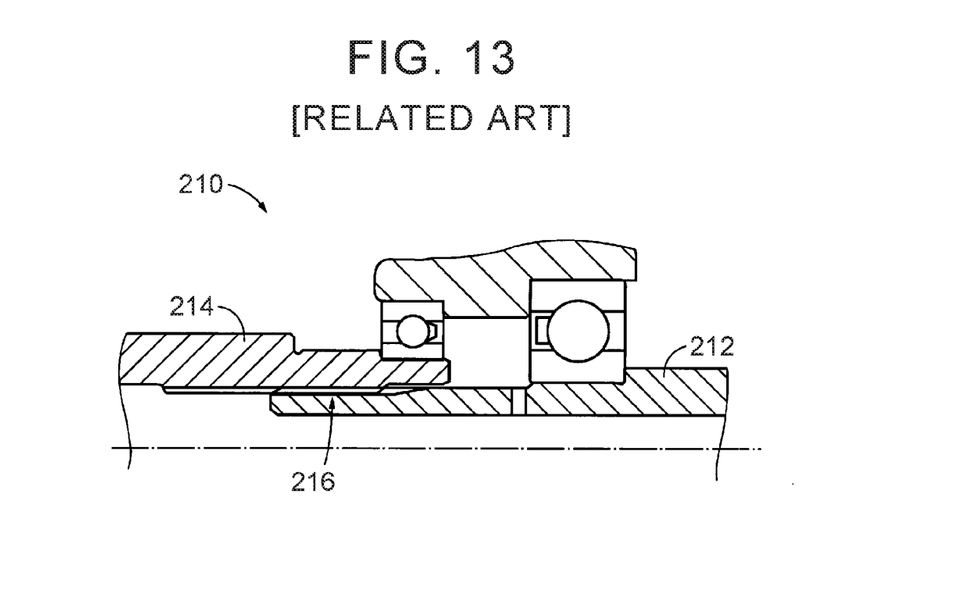
FIG. 13 is a sectional view taken along an axis of a power transmission structure of a vehicle according to a related art.

A power transmission structure of a vehicle, which includes a first rotor and a second rotor, is known. The first rotor is connected with a power transmission member so as to be able to transmit power, the power transmission member transmitting power of an engine. The second rotor is provided concentrically with the first rotor and spline-fitted to the first rotor. FIG. 13 is a sectional view of an example of a power transmission structure 210 of a vehicle according to a related art. In the power transmission structure 210 of a vehicle, a first rotor 212 and a second rotor 214 are connected with each other by a spline fitting part 216 so as to be able to transmit power. In the spline fitting part 216, a spline tooth of the first rotor 212, to which, for example, power from an engine is transmitted through a power transmission member, and a spline tooth of the second rotor 214 provided concentrically with the first rotor 212, are spline-fitted to each other. Therefore, there is a possibility that tooth hitting sound occurs in the spline fitting part 216 due to misalignment of the axis of the first rotor 212 and the axis of the second rotor 214. The misalignment happens because of torque fluctuation and so on, transmitted through the first rotor 212, during an expansion stroke associated with ignition of the engine, especially when the rotational speed of the second rotor 214 is small.

In order to reduce the problem of the above-mentioned tooth hitting sound, a power transmission structure of a vehicle is proposed in, for example, Japanese Patent Application Publication No. 2011-214646 (JP 2011-214646 A), in which an annular elastic member that is elastically deformable in a radial direction is press-fitted between an inner peripheral surface and an outer peripheral surface of a first rotor and a second rotor, respectively adjacent to a spline fitting part in an axial direction. The inner peripheral surface and the outer peripheral surface of the first rotor and the second rotor face each other in the radial direction. Thus, misalignment between the axis of the first rotor and the axis of the second rotor is restrained, and tooth hitting sound generated in a spline fitting part caused by the axis misalignment is reduced.

In a vehicle in which the above-mentioned power transmission structure of a vehicle is provided, and, for example, the second rotor is connected with an electric motor, an damping control is performed. In the damping control, damping torque for restraining torsional vibration from an engine is outputted from the electric motor in order to, for example, restrain generation of cabin booming noise caused by torque fluctuation of, for example, an axle. Damping torque outputted in the damping control is outputted based on a phase of torsional vibration so as to cancel the torsional vibration. Therefore, it is required that no shift of the phase should happen when transmitting damping torque outputted from the electric motor to the power transmission member to which torsional vibration is transmitted through the second rotor. However, in the power transmission structure of a vehicle described in JP 2011-214646 A stated above, the elastic member, which is press-fitted between the second rotor connected with the electric motor, and the first rotor in the radial direction, has low rigidity. Since there is backlash in the spline fitting part between the first rotor and the second rotor, the elastic member is deformed in a circumferential direction between the second rotor and the first rotor, and responsiveness of torque transmission between the second rotor and the first rotor is deteriorated. This could cause a shift of the phase before and after transmission of damping torque of the electric motor from the second rotor to the first rotor. Due to the shift of the phase of the damping torque, a damping effect of torsional vibration of the engine by the damping control could be deteriorated.

SUMMARY OF THE INVENTION

The invention has been accomplished in view of the foregoing situation, and provides a power transmission structure of a vehicle, which restrains axis misalignment between a first rotor and a second rotor connected with each other by spline-fitting, and improves responsiveness of torque transmission between the first rotor and the second rotor.

According to an aspect of the invention, a power transmission structure of a vehicle having a first rotor, a second rotor, and a metallic cylinder is provided. The first rotor is connected with a power transmission member which is configured to transmit power. The power transmission member transmits power of an engine. The second rotor is provided concentrically with the first rotor and spline-fitted to the first rotor. The metallic cylinder is configured to be able to deform elastically in a radial direction and interposed in a part where the first rotor and the second rotor overlap each other in the radial direction. The metallic cylinder has a first region, a second region, and a third region. The first region is a region that comes into contact with the first rotor. The second region is a region that comes into contact with the second rotor. The third region is a region that connects the first region and the second region with each other.

The above-mentioned power transmission structure of a vehicle according to the invention has the metallic cylinder that is able to deform elastically in the radial direction and interposed in the part where the first rotor and the second rotor overlap each other in the radial direction, and the metallic cylinder is structured from the first region that comes into contact with the first rotor, the second region that comes into contact with the second rotor, and the third region that connects the first region and the second region with each other. Thus, the metallic cylinder is provided between the first rotor and the second rotor in a state where the third region between the first region, which is in contact with the first rotor, and the second region, which is in contact with the second rotor, is compressed in the radial direction. Therefore, the first rotor and the second rotor receive reaction force from the metallic cylinder in radially opposite directions. Thus, misalignment between the axis of the first rotor and the axis of the second rotor is restrained, and generation of tooth hitting sound is thus restrained. Further, since the metallic cylinder has high rigidity in a rotation direction, the metallic cylinder is restrained from being deformed in the rotation direction. Therefore, responsiveness of torque transmission between the first rotor and the second rotor is improved.

In the foregoing power transmission structure, the first rotor may be a driving shaft, and the second rotor may be a rotating shaft of an electric motor. In such a power transmission structure, the metallic cylinder is interposed so as to be able to deform elastically in a part where the driving shaft and the rotating shaft of the electric motor overlap each other in the radial direction. The driving shaft is connected with the power transmission member, which transmits power of an engine, so as to be able to transmit power. Therefore, responsiveness of torque transmission between the driving shaft and the rotating shaft of the electric motor is improved. Because of this, during damping control for restraining rotating fluctuation of the engine, a shift of a phase is restrained before and after damping torque, outputted from the electric motor, is transmitted from the rotating shaft of the electric motor to the driving shaft. Thus, an effect of the damping control is maintained.

In the foregoing power transmission structure, resonance frequency of the power transmission structure, which is made from the driving shaft, the rotating shaft of the electric motor, and the metallic cylinder, may be an upper limit of rotational speed of engine or higher. The metallic cylinder may be elastically deformable in the radial direction and may be interposed in a part where the driving shaft and the rotating shaft of the electric motor overlap each other in the radial direction. In such a power transmission structure, resonance frequency of the power transmission structure of a vehicle does not coincide with frequency in a normal rotation region of the engine. Therefore, generation of resonance is restrained, and deterioration of drivability is thus restrained.

In the foregoing power transmission structure, the rotating shaft of the electric motor may be a rotor shaft of a second electric motor of a hybrid vehicle in which the engine, a first electric motor, and a planetary gear connected with the engine and the first electric motor are arranged on a different rotation axis from that of the second electric motor. The driving shaft may be a reduction shaft. The metallic cylinder may be provided between the rotor shaft of the second electric motor and the reduction shaft in the hybrid vehicle. According to such a power transmission structure, the metallic cylinder is provided between the reduction shaft, to which power from the engine is transmitted, and the rotor shaft of the second electric motor. Therefore, misalignment between the axis of the reduction shaft and the axis of the rotor shaft of the second electric motor is restrained in the hybrid vehicle. At the same time, a shift of a phase is restrained before and after damping torque is transmitted from the rotor shaft of the second electric motor to the reduction shaft. The damping torque is outputted from the second electric motor during damping control for restraining rotation fluctuation of the engine. Therefore, an effect of the damping control is maintained.

In the foregoing power transmission structure, the first rotor may be a sun gear of a second planetary gear of a hybrid vehicle in which the engine, a first electric motor, and a first planetary gear connected with the engine and the first electric motor are arranged on the same rotation axis as a second electric motor and a second planetary gear to which the second electric motor is connected. The second rotor may be a rotor shaft of the second electric motor, and the metallic cylinder may be provided between the rotor shaft of the second electric motor and the sun gear in the hybrid vehicle. According to such a power transmission structure, the metallic cylinder is provided between the sun gear of the second planetary gear, to which power is transmitted from the engine, and the rotor shaft of the second electric motor. Therefore, in the hybrid vehicle, misalignment between the axis of the sun gear of the second planetary gear and the axis of the rotor shaft of the second electric motor is restrained. At the same time, a shift of a phase is restrained before and after damping torque is transmitted from the rotor shaft of the second electric motor to the sun gear of the second planetary gear. Damping toque is outputted from the second electric motor during damping control for restraining rotation fluctuation of the engine. Therefore, an effect of the damping control is maintained.

In the foregoing power transmission structure, resonance frequency of the power transmission structure, which is made from the sun gear, the rotor shaft of the second electric motor, and the metallic cylinder, may be the upper limit of rotational speed of engine or higher. The metallic cylinder is elastically deformable in a radial direction and is interposed in a part where the sun gear and the rotor shaft overlap each other in the radial direction. According to such a power transmission structure, resonance frequency of the power transmission structure of a vehicle does not coincide with frequency in a normal rotation region of the engine. Therefore, generation of resonance is restrained, and deterioration of drivability is thus restrained.

Furthermore, in the foregoing power transmission structure, the first rotor may be a carrier of a first planetary gear of a hybrid vehicle in which the engine, a first electric motor, and the first planetary gear connected with the engine and the first electric motor are arranged on the same rotation axis as that of a second electric motor and a second planetary gear to which the second electric motor is connected. The second rotor may be a sun gear of the second planetary gear, and the metallic cylinder may be provided between the carrier of the first planetary gear and the sun gear of the second planetary gear in the hybrid vehicle. According to such a power transmission structure, the metallic cylinder is provided between the carrier of the first planetary gear, to which power of the engine is transmitted, and the sun gear of the second planetary gear. Therefore, misalignment between the axis of the carrier of the first planetary gear and the axis of the sun gear of the second planetary gear is restrained in the hybrid vehicle. At the same time, a shift of a phase is restrained before and after damping torque is transmitted from the sun gear of the second planetary gear to the carrier of the first planetary gear. Damping toque is outputted from the second electric motor during damping control for restraining rotation fluctuation of the engine. Therefore, an effect of the damping control is maintained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First of all, the first embodiment of a power transmission structure of a vehicle according to the invention is explained in detail with reference to the drawings.

Figure 1:
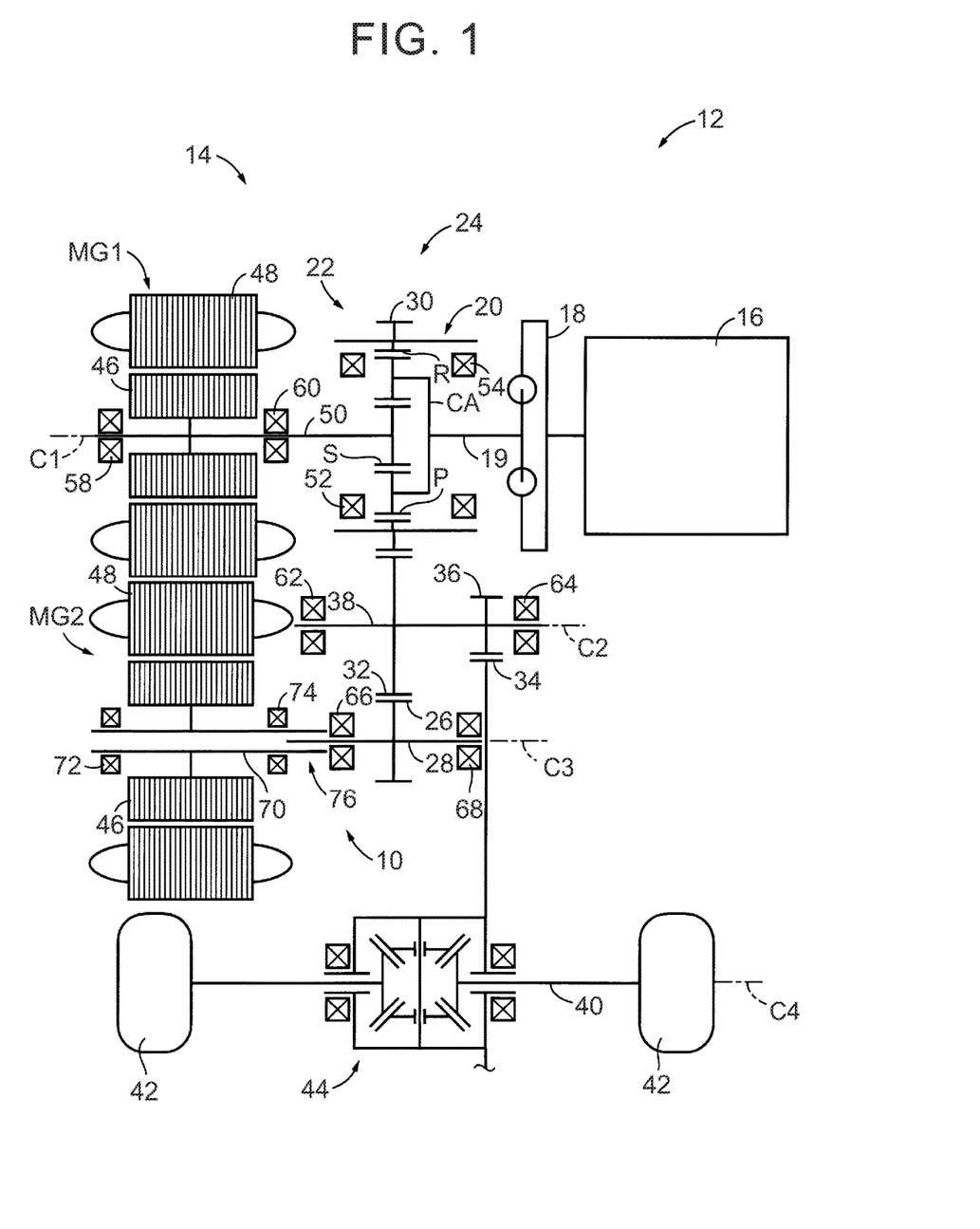
FIG. 1 is an outline view explaining a structural example of a driving device for a hybrid vehicle provided in a hybrid vehicle, the driving device including a power transmission structure of a vehicle, which is the first embodiment as an example of the invention.

FIG. 1 is an outline view explaining a structural example of a driving device 14 for a hybrid vehicle (herein below, referred to as a "driving device 14") provided in a hybrid vehicle 12, the driving device 14 including a power transmission structure 10 of a vehicle, which is the first embodiment of the invention. The driving device 14 is structured by including an engine 16, a first electric motor MG1, a second electric motor MG2, a power distribution mechanism (also referred to as a differential mechanism) 22, a counter shaft 38, a reduction shaft 28, a differential gear mechanism 44 and so on. The engine 16 functions as a main drive power source of the vehicle 12. The differential mechanism 22 distributes power, which is transmitted from the engine 16 to an input shaft 19 through a damper device 18, to the first electric motor MG1 and an output member 20. Here, the differential mechanism 22 structures an electric differential part 24, which is a mechanism that controls a gear ratio by controlling a driving state of the first electric motor MG1. The second electric motor MG2 is arranged on a different rotation axis from that of the first electric motor MG1 and functions as a drive power source. To the reduction shaft 28, power of the second electric motor MG2 is transmitted, and the reduction shaft 28 is provided with a reduction gear 26. The counter shaft 38 has a counter driven gear 32 meshing with an output gear 30 formed in the output member 20, and the reduction gear 26, and a counter drive gear 36 meshing with a differential ring gear 34. To the differential gear mechanism 44, power is transmitted from the counter drive gear 36, and the differential gear mechanism 44 transmits power to left and right driving wheels 42 through a pair of left and right axles 40. The second electric motor MG2 is an example of an electric motor according to the invention. The reduction shaft 28 is an example of the driving shaft of the invention.

The driving device 14 is used suitably in a FF (front engine, front drive) hybrid vehicle. The driving device 14 has four rotation axes C1~C4. Specifically, the driving device 14 has the engine 16, the differential mechanism 22, the first rotation axis C1, the second rotation axis C2, the second electric motor MG2, the third rotation axis C3, and the fourth rotation axis C4. On the first rotation axis C1, the first electric motor MG1 is arranged. On the second rotation axis C2, the counter shaft 38 is arranged on which the counter driven gear 32 and the counter drive gear 36 are formed. On the third rotation axis C3, the reduction shaft 28 is arranged, on which the reduction gear 26 is formed. On the fourth rotation axis C4, the differential gear mechanism 44 is arranged. As stated above, the engine 16, the first electric motor MG1, and the differential mechanism 22 connected with the engine 16 and the first electric motor MG1 are arranged on a different rotation axis from that of the second electric motor MG2, and the vehicle 12 is thus a double-shaft type hybrid vehicle.

The first electric motor MG1 and the second electric motor MG2 are structured from AC synchronous electric motors including rotors 46 having a plurality of permanent magnets and stators 48 generating rotating magnetic fields, and both of them are motor generators that function as motors (electric motors) and generators (electric generators).

The damper device 18 is arranged between the input shaft 19 and the engine 16 and absorbs torque fluctuation transmitted from the engine 16.

The differential mechanism 22 functions as a power distributing device that distributes power outputted from the engine 16 to the first electric motor MG1 and the output member 20. The differential mechanism 22 is structured from a single-pinion type planetary gear that includes a sun gear S connected with a first rotor shaft 50 of the first electric motor MG1, a ring gear R provided concentrically with the sun gear S and integrally with an inner peripheral part of the cylindrical output member 20, and a carrier CA that supports a pinion P meshing with the sun gear S and the ring gear R so as to be able to rotate and revolve, and is connected with the input shaft 19 to which power from the engine 16 is transmitted through the damper device 18.

Figure 2:
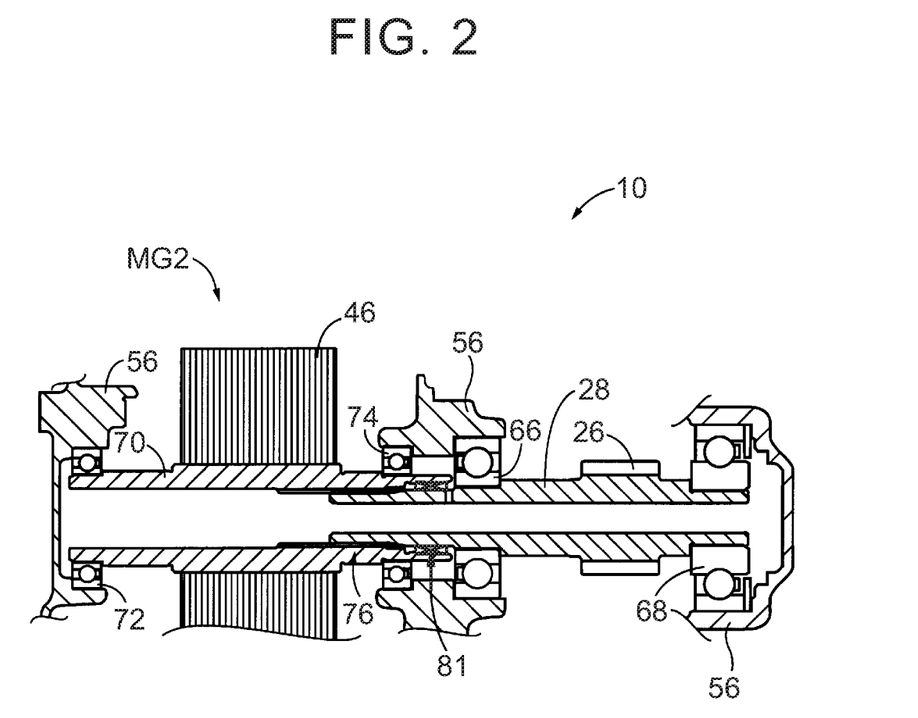
FIG. 2 is a sectional view of a structure of the power transmission structure of a vehicle provided in the driving device shown in FIG. 1.

The output member 20 is supported by a case 56 so as to be able to rotate relative to the case 56, through a first bearing 52 and a second bearing 54 provided in inner peripheral ends of the output member 20. The case 56 houses the first electric motor MG1, the second electric motor MG2, each of the shafts and so on. The first rotor shaft 50 is supported by the case 56 (the case 56 is illustrated in FIG. 2) so as to be able to rotate relative to the case 56, through a third bearing 58 and a fourth bearing 60 provided in outer peripheral ends of the first rotor shaft 50. The counter shaft 38 is supported by the case 56 so as to be able to rotate relative to the case 56 through a fifth bearing 62 and a sixth bearing 64 provided in outer peripheral ends of the counter shaft 38.

Power transmitted from the engine 16 to the output member 20 is transmitted to the left and right driving wheels 42 through the counter driven gear 32, which meshes with the output gear 30 formed on an outer periphery of the output member 20, the counter shaft 38, the counter drive gear 36, the differential ring gear 34, the differential gear mechanism 44, and the pair of axles 40.

FIG. 2 is a sectional view of the structure of the power transmission structure 10 of a vehicle arranged around the third axis C3 of the driving device 14. The reduction shaft 28 serving as the first rotor is a cylindrical member, is provided with the reduction gear 26 meshing with the counter driven gear 32 formed on the counter shaft 38, is connected with the counter shaft 38 functioning as a power transmission member for transmitting power of the engine so as to be able to transmit power, and functions as a driving shaft that drives the driving wheels 42 through the counter shaft 38 and so on by using the second electric motor MG2. The reduction shaft 28 is connected with the case 56 through a seventh bearing 66 and an eighth bearing 68 so as to be able to rotate relative to the case 56. A second rotor shaft 70 serving as the second rotor is a cylindrical member, and is supported by the case 56 concentrically with the reduction shaft 28 through a ninth bearing 72 and a tenth bearing 74 provided in outer peripheral ends of the second rotor shaft 70, so that the second rotor shaft 70 is able to rotate relative to the case 56. An inner peripheral part of the rotor 46 of the second electric motor MG2 is fixed to a center part of the outer periphery of the second rotor shaft 70 so that the rotor 46 is not able to rotate relative to the second rotor shaft 70, and rotation of the second electric motor MG2 is thus transmitted to the second rotor shaft 70. Thus, the second rotor shaft 70 functions as a rotating shaft of the electric motor. The second rotor shaft 70 and the reduction shaft 28 are connected with each other by a spline fitting part 76 so as to be able to transmit power. The spline fitting part 76 is formed between an inner peripheral end of the second rotor shaft 70 on the seventh bearing 66 side, and an outer peripheral end of the reduction shaft 28 on the second electric motor MG2 side. As stated above, the power transmission structure 10 of a vehicle is structured by the reduction shaft 28, which is connected with the counter shaft 38 transmitting power of the engine 16, so as to be able to transmit power, and the second rotor shaft 70 that is spline-fitted to the reduction shaft 28. Thus, power transmitted from the second electric motor MG2 to the second rotor shaft 70 is transmitted to the left and right driving wheels 42 through the reduction shaft 28, the reduction gear 26, the counter driven gear 32, the counter shaft 38, the counter drive gear 36, the differential ring gear 34, the differential gear mechanism 44, and the pair of axles 40.

Figure 3:
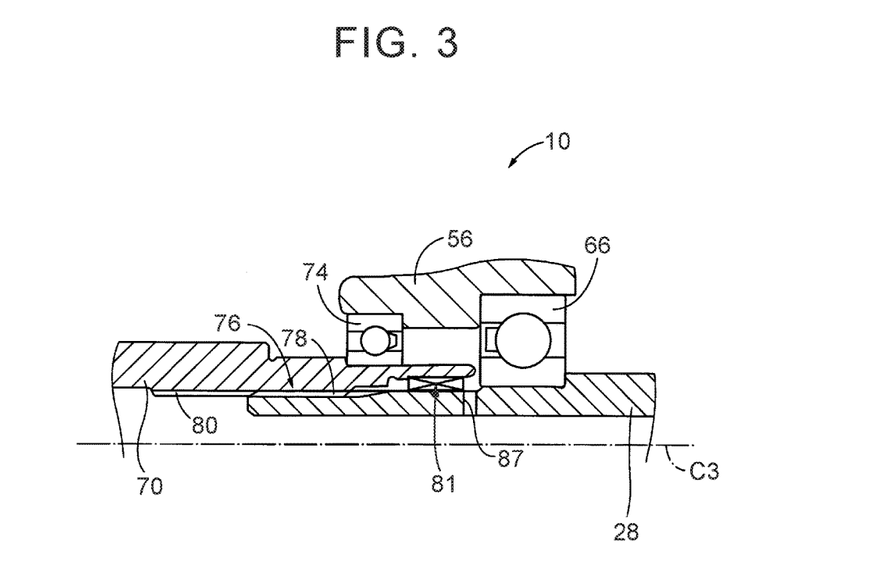
FIG. 3 is an enlarged view of a periphery of a spline fitting part of the power transmission structure of a vehicle shown in FIG. 2.

FIG. 3 is an enlarged view of the vicinity of the spline fitting part 76 of the power transmission structure 10 of a vehicle. The spline fitting part 76 of the power transmission structure 10 of a vehicle is structured by fitting an outer peripheral spline tooth 78 and an inner peripheral spline tooth 80 to each other. The outer peripheral spline tooth 78 is formed on the outer peripheral end of the reduction shaft 28 on the second electric motor MG2 side. The inner peripheral spline tooth 80 is formed in the inner peripheral end of the second rotor shaft on the seventh bearing 66 side. There is backlash between the inner peripheral spline tooth 80 and the outer peripheral spline tooth 78.

Due to, for example, torque fluctuation generated during an expansion stroke and so on of the engine 16, misalignment happens between the axis of the reduction shaft 28 and the axis of the second rotor shaft 70 especially when output torque of the second electric motor MG2 is small. Because of this, there is a possibility that tooth hitting sound is generated between the outer peripheral spline tooth 78 and the inner peripheral spline tooth 80. For an aligning member, which restrains axis misalignment between the second rotor shaft 70 and the reduction shaft 28 in order to restrain generation of this tooth hitting sound, it is necessary to consider an influence on a damping effect of damping control. The damping control is performed in order to restrain deterioration of drivability caused by booming noise generated by torque fluctuation of the axle 40 and so on, and, for example, damping torque for attenuating torque fluctuation of the engine 16 is outputted.

In FIG. 3, a cylindrical metallic member 81 is provided in a part adjacent to the spline fitting part 76 in an axial direction of the reduction shaft 28. The cylindrical metallic member 81 is press-fitted between the outer peripheral surface between the seventh bearing 66 and the outer peripheral spline tooth 78, and the inner peripheral surface of the second rotor shaft 70 on the seventh bearing 66 side in a part beyond the inner peripheral spline tooth 78.

Figure 4:
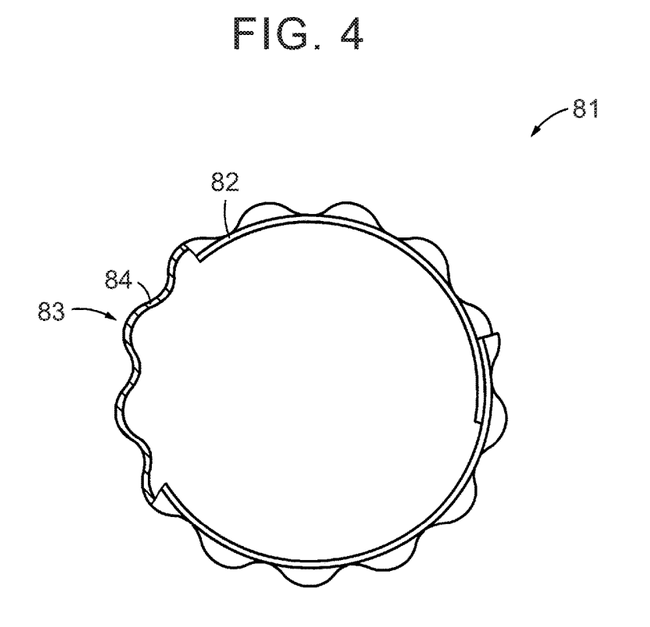
FIG. 4 is a side view of a cylindrical metallic member provided in the power transmission structure of a vehicle shown in FIG. 2, the cylindrical metallic member being partially cut out and seen in a center line direction.

FIG. 4 is a view of the cylindrical metallic member 81 that is partially cut out and seen in the center line direction. The cylindrical metallic member 81 is formed by pressing, for example, a steel or stainless steel thin plate, and is elastically deformable in a thickness direction, and also plastically deformable in some cases. The cylindrical metallic member 81 is provided with a cylindrical body part 82, and projecting parts 83 that are formed in a projecting fashion on a radially outer side in the circumferential direction at given intervals except in both edge parts of the body part 82 in the width direction. Thus, the cylindrical metallic member 81 has peaks of the projecting parts 83 and valleys of the projecting parts 83, which exist on the same cylindrical surface as the body part 82, at given intervals in the circumferential direction. After the outer peripheral spline tooth 78 of the reduction shaft 28 and the inner peripheral spline tooth 80 of the second rotor shaft 70 are fitted to each other, in the cylindrical metallic member 81, regions around the peaks of the projecting parts 83 abut on the inner peripheral surface of the second rotor shaft 70, and the body part 82 including regions around the valleys of the projecting parts 83 abut on the outer peripheral surface of the reduction shaft 28. Then, the cylindrical metallic member 81 is press-fitted between the outer peripheral surface of the reduction shaft 28 and the inner peripheral surface of the second rotor shaft 70 in a state where an intermediate part 84 which connect the region around the peak of the projecting part 83 with the region around the valley of the projecting part 83 is compressed in the radial direction. The region around the peak of the projecting part 83 is an example of the second region according to the invention. The region around the valley of the projecting part 83 is an example of the first region according to the invention. The intermediate part 84 is the third region according to the invention. Due to compression of the intermediate part 84 in the radial direction, reaction force towards the inner periphery side is always applied to the outer peripheral surface of the reduction shaft 28 from the body part 82 including the regions around the valleys of the projecting parts 83. Also, reaction force towards the outer periphery side is always applied to the inner peripheral surface of the second rotor shaft 70 from the regions around the peaks of the projecting parts 83. Since the reaction force is equal to each other, generation of misalignment between the axis of the reduction shaft 28 and the axis of the second rotor shaft 70 is restrained. When torque acting between the second rotor shaft 70 and the reduction shaft 28 is smaller than a given torque value due to friction force generated between the body part 82 including the regions around the valleys of the projecting parts 83 and the outer peripheral surface of the reduction shaft 28, and between the regions around the peaks of the projecting parts 83 and the inner peripheral surface of the second rotor shaft 70, the cylindrical metallic member 81 allows the reduction shaft 28 and the second rotor shaft 70 to rotate integrally without allowing sliding to happen between the outer peripheral surface of the reduction shaft 28 and the inner peripheral surface of the second rotor shaft 70, thereby transmitting torque. When torque acting between the second rotor shaft 70 and the reduction shaft 28 is larger than the given torque value, the cylindrical metallic member 81 allows sliding to happen between the outer peripheral surface of the reduction shaft 28 and the inner peripheral surface of the second rotor shaft 70, thereby allowing the reduction shaft 28 and the second rotor shaft 70 to rotate relative to each other. Thus, torque is transmitted by the spline fitting part 76. Here, the given torque value is set to at least a small torque value of torque fluctuation that happens during an expansion stroke of the engine 16 and so on. The cylindrical metallic member 81 transmits torque between the reduction shaft 28 and the second rotor shaft 70 against torque fluctuation generated during an expansion stroke of the engine 16 and so on, and substantially eliminates backlash between the reduction shaft 28 and the second rotor shaft 70.

Further, the reduction gear 28 is provided with a radial direction oil passage 87 adjacent to the cylindrical metallic member 81 on the axially opposite side of the spline fitting part 76 on the basis of the outer peripheral surface where the cylindrical metallic member 81 is provided. Lubricating oil that has passed through the radial direction oil passage 87 moves to the spline fitting part 76 through axial through holes of the cylindrical metallic member 81, thereby lubricating the spline fitting part 76. The through holes are formed between, for example, the outer peripheral surfaces of the projecting parts 83 and the inner peripheral surface of the second rotor shaft 70, which faces the outer peripheral surfaces of the projecting parts 83.

Rigidity of the cylindrical metallic member 81 is set in advance so that resonance frequency f of the power transmission structure 10 of a vehicle becomes an upper limit of rotational speed Nemax in a normal rotation region of the engine 16 or higher. The power transmission structure 10 of a vehicle is structured by the reduction shaft 28, the second rotor shaft 70, and the cylindrical metallic member 81 that is elastically deformable in the radial direction and press-fitted to a part where the reduction shaft 28 and the second rotor shaft 70 overlap with each other in the radial direction. A method for setting rigidity of the cylindrical metallic member 81 is explained below by using FIG. 5 and FIG. 6.

Figure 5:
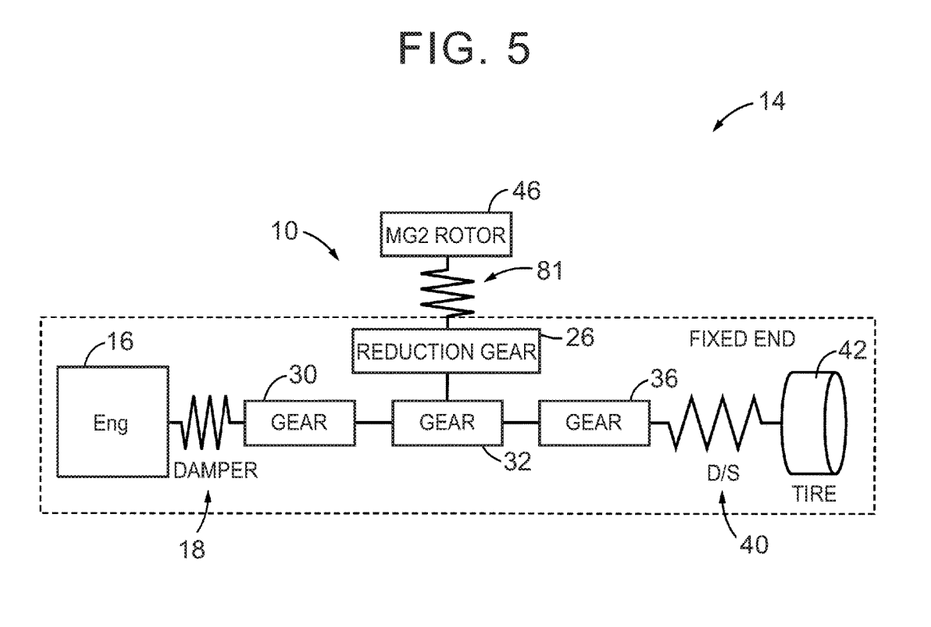
FIG. 5 is a schematic view explaining a power transmission route from an engine to left and right driving wheels, and a power transmission route from the engine to a rotor of a second electric motor in the driving device shown in FIG. 1.
Figure 6:
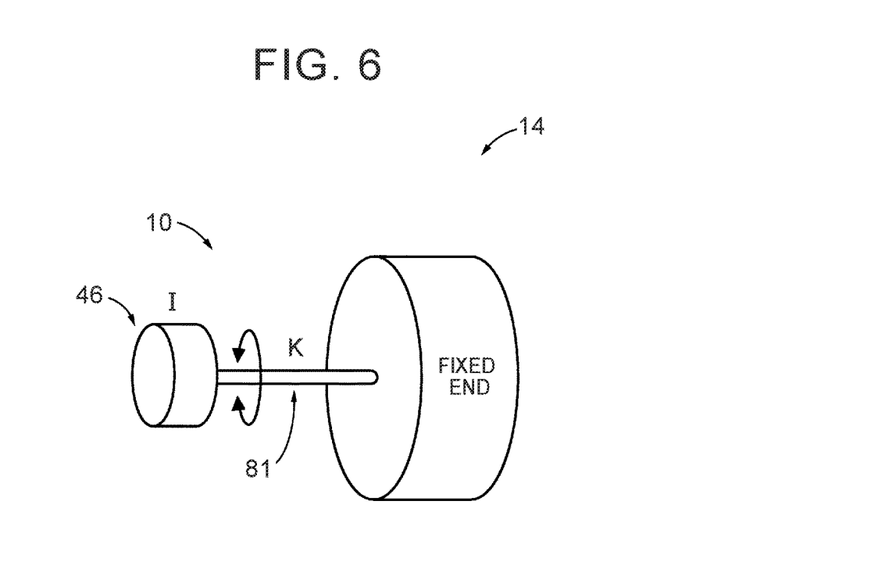
FIG. 6 is a view for explaining each variable used in obtaining resonance frequency that is unique frequency in a single-degree-of-freedom system of the power transmission structure of a vehicle shown in FIG. 2.

FIG. 5 is a schematic view of power transmission routes from the engine 16 to the left and right driving wheels 42 and to the rotor 46 of the second electric motor MG2. As shown in FIG. 5, the engine 16 is connected with the damper device 18, the differential mechanism 22, the output gear 30, the counter driven gear 32, the counter drive gear 36, the differential gear mechanism 44, and the pair of axles 40 (D/S: drive shafts) connected with the left and right driving wheels 42, and torsional vibration of the engine 16 is transmitted to the pair of axles 40. The engine 16 is connected with the rotor 46 of the second electric motor MG2 through the counter driven gear 32, the reduction gear 26, the reduction shaft 28, the spline fitting part 76, and the second rotor shaft 70 so as to be able to transmit power. Therefore, in the power transmission structure 10 of the electric motor, the cylindrical metallic member 81 serves as a spring, and the rotor 46 of the second electric motor MG2 connected through the second rotor shaft 70 abutting on the cylindrical metallic member 81 serves as a mass. Rigidity of the cylindrical metallic member 81 is set so that deterioration of drivability caused by a resonance phenomenon with frequency of engine rotation inside the driving device 14 is restrained, when the power transmission structure 10 is regarded as a dynamic damper with which a fixed end indicated by the broken line in FIG. 5 is connected through the reduction shaft 28 that is in contact with the cylindrical metallic member 81. FIG. 6 is a view for explaining each variable used in obtaining resonance frequency f, which is unique frequency in a single-degree-of-freedom system of the power transmission structure 10 of a vehicle, which is regarded as a dynamic damper. The fixed end indicated by the broken line in FIG. 5 corresponds to a fixed end on the right side. In FIG. 6, when rigidity of the cylindrical metallic member 81 in a rotation direction shown by an arrow is K (Nm/rad), and an inertia amount of the rotor 46 of the second electric motor MG2 as a mass is I (Kgm$^2$), resonance frequency f (Hz) of the power transmission structure 10 of a vehicle, as a dynamic damper, is obtained by formula (1). The resonance frequency f is converted into conversion value of the rotational speed of engine Nef (rpm) by formula (2). Rigidity K of the cylindrical metallic member 81 in the rotation direction is set so that the conversion value of the rotational speed of engine Nef, which is converted from the obtained resonance frequency f of the power transmission structure 10 of a vehicle, becomes an upper limit of rotational speed Nemax (rpm) in the normal rotation region of the engine 16 of the vehicle 12. The rigidity of the cylindrical metallic member 81, which is set as stated above, is higher than that of a publicly known friction damper formed from rubber and so on. Thus, when torque that is added between the reduction shaft 28 and the second rotor shaft 70 is smaller than the given torque value, the cylindrical metallic member 81 transmits torque without being deformed in the rotation direction.

[Numerical Formula 1]

$$f = \frac{1}{2\pi}\sqrt{\frac{K}{I}} \qquad (1)$$

$$f = \frac{Nef \times 2}{60} \qquad (2)$$

Figure 7:
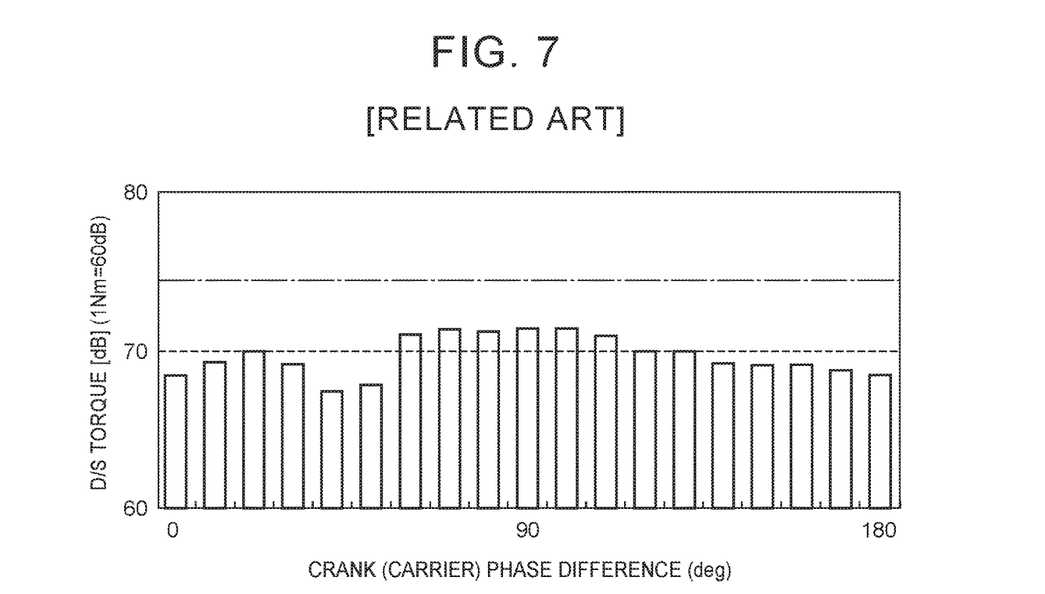
FIG. 7 is a graph showing a relationship between a rotational position of a crank shaft, which is expressed as a phase difference from a reference rotational position of the crank shaft of an engine, and transmission torque transmitted to an axle with respect to input torque inputted from the engine when damping torque in a phase opposite to each rotational position of the crank shaft is outputted from the second electric motor MG2, in a power transmission structure of a vehicle according to related art, in a case where an aligning member is not provided between an outer peripheral surface of a power transmission shaft and an inner peripheral surface of a second rotor shaft.
Figure 8:
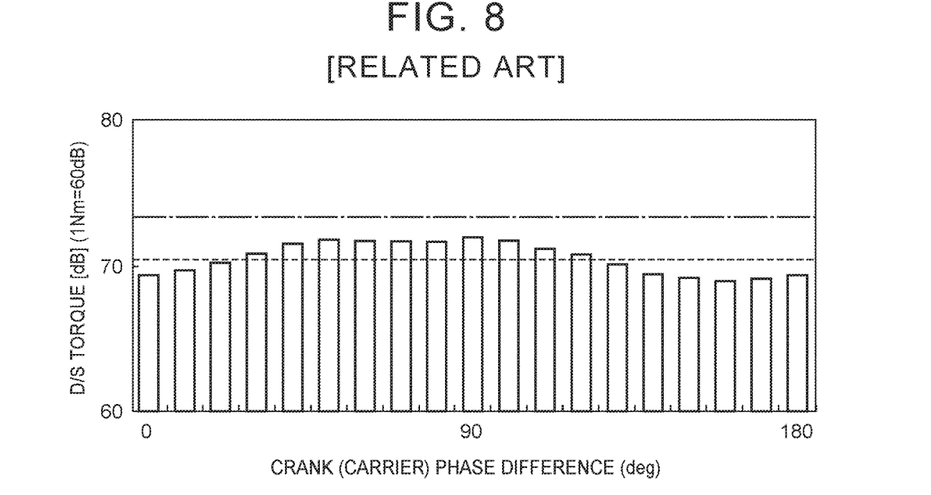
FIG. 8 is a graph corresponding to FIG. 7 in a power transmission structure of a vehicle according to a related art, in a case where a friction damper is provided between an outer peripheral surface of a power transmission shaft and an inner peripheral surface of a second rotor shaft.
Figure 9:
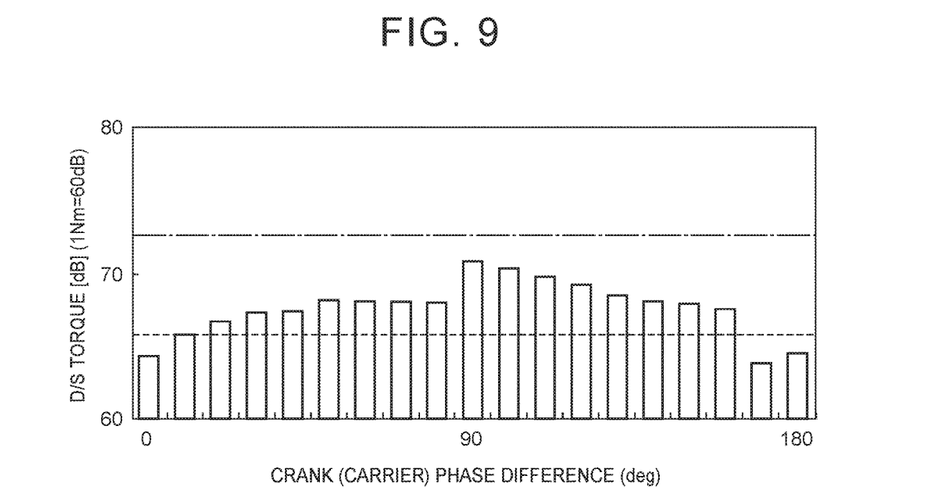
FIG. 9 is a graph corresponding to FIG. 7 in the power transmission structure of a vehicle shown in FIG. 2, in a case where the cylindrical metallic member is provided between an outer peripheral surface of a power transmission shaft and an inner peripheral surface of a second rotor shaft.

Next, an effect of the damping control, which restrains rotation fluctuation from the engine 16, is verified in the driving device 14 provided with the power transmission structure 10 of a vehicle. FIG. 7 is a view showing a case of a power transmission structure of a vehicle according to a related art, in which an aligning member is not provided between an outer peripheral surface of a reduction shaft 28 and an inner peripheral surface of a second rotor shaft 70. FIG. 8 is a view showing a case of a power transmission structure of a vehicle according to a related art, in which a rubber friction damper with rigidity of 3500 Nm/rad is provided as a spring element between an outer peripheral surface of a reduction shaft 28 and an inner peripheral surface of a second rotor shaft 70. FIG. 9 is a view showing a case of the power transmission structure 10 of a vehicle according to the first embodiment, in which the cylindrical metallic member 81 with rigidity of 38000 Nm/rad, which is higher than that of the friction damper stated above, is provided between the outer peripheral surface of the reduction shaft 28 and the inner peripheral surface of the second rotor shaft 70. FIG. 7~FIG. 9 are graphs showing relationships between a rotational position of a crank shaft and transmission torque (dB) transmitted to the axle 40 in the respective cases of the power transmission structures 10. The rotational position of the crank shaft is expressed as a phase difference (degrees) with respect to a reference rotational position of the crank shaft of the engine 16 when the engine 16 is operated under conditions of the rotational speed of engine of 1200 rpm, a DC component of 80 Nm, and an AC component of 134 Nm. The transmission torque (dB) transmitted to the axle 40 is torque with respect to input torque from the engine 16 at each rotational position of the crank shaft when damping torque in a phase opposite to each rotational position of the crank shaft is outputted from the second electric motor MG2. In this verification, backlash at 1.0 (degree) is provided between the outer peripheral spline tooth 78 of the reduction shaft 28 and the inner peripheral spline tooth 80 of the second rotor shaft 70. The broken line represents torque transmitted to the axle 40 with respect to input torque from the engine 16 in a state where pressing torque, which is negative torque of −1.0 Nm, for pressing the spline teeth against each other is outputted from the second electric motor MG2 against the input torque from the engine 16. The alternate long and short dash line represents torque transmitted to the axle 40 with respect to input torque from the engine 16 in a state where neither damping torque nor pressing torque are outputted from the second electric motor MG2.

In the power transmission structure of a vehicle shown in FIG. 7 according to a related art, in which no aligning member is provided between the outer peripheral surface of the reduction shaft 28 and the inner peripheral surface of the second rotor shaft 70, the power transmission structure of a vehicle shown in FIG. 8 according to a related art, in which a friction damper is provided between the outer peripheral surface of the reduction shaft 28 and the inner peripheral surface of the second rotor shaft 70, and the power transmission structure 10 of a vehicle shown in FIG. 9, in which the cylindrical metallic member 81 is provided between the outer peripheral surface of the reduction shaft 28 and the inner peripheral surface of the second rotor shaft 70, in the case where the pressing torque is outputted from the second electric motor MG2, torque transmitted to the axle 40 with respect to the input torque from the engine 16 is lower than that in the case where torque is not outputted from the second electric motor MG2. In the power transmission structure of a vehicle according to a related art shown in FIG. 7, in the case where damping torque is outputted from the second electric motor MG2, the lowest torque transmitted to the axle 40 with respect to the engine input torque is 67.5 dB when the crank angle is at 40 degrees out of the crank angle from 0 degree to 180 degrees. On the contrary, in the power transmission structure of a vehicle shown in FIG. 8, which is provided with the friction damper, in the case where damping torque is outputted from the second electric motor MG2, the lowest torque transmitted to the axle 40 with respect to the engine input torque is 69.0 dB when the crank angle is at 160 degrees out of the crank angles from 0 degree to 180 degrees. This is larger than 67.5 dB, which is the lowest toque in the case where damping torque is outputted from the second electric motor MG2 in the power transmission structure of a vehicle shown in FIG. 7, meaning that an effect of the damping control is deteriorated. This is caused by a shift of a phase that happens before and after damping torque from the second electric motor MG2 is transmitted from the second rotor shaft 70 to the reduction shaft 28, because rigidity of the friction damper provided between the reduction shaft 28 and the second rotor shaft 70 is low and the friction damper is thus deformed in the rotation direction. In the case where damping torque is outputted from the second electric motor MG2 of the power transmission structure 10 of a vehicle shown in FIG. 9, the lowers torque transmitted to the axle 40 with respect to the engine input torque is 63.6 dB when the crank angle is at 170 degrees out of the crank angles of from 0 degree to 180 degrees. This is lower than 67.5 dB, which is the lowest toque in the case where the damping torque is outputted from the second electric motor MG2 of the power transmission structure of a vehicle shown in FIG. 7 according to a related art, meaning that an effect of the damping control is improved. This is because, while torque acting between the reduction shaft 28 and the second rotor shaft 70 is smaller than the given torque value, and torque is transmitted by the cylindrical metallic member 81, it is regarded that there is substantially no backlash between the reduction shaft 28 and the second rotor shaft 70. At the same time, since rigidity of the cylindrical metallic member 81 in the rotation direction is high, the cylindrical metallic member 81 is not deformed in the rotation direction. Therefore, a shift of a phase in the rotational direction between the second rotor shaft 70 and the reduction shaft 28 is reduced before and after damping torque from the second electric motor MG2 is transmitted from the second rotor shaft 70 to the reduction shaft 28.

As stated above, the power transmission structure 10 of a vehicle according to the first embodiment has the cylindrical metallic member 81 that is elastically deformable in the radial direction and press-fitted into the part where the reduction shaft 28 and the second rotor shaft 70 of the second electric motor MG2 overlap each other in the radial direction adjacent to the spline fitting part 76. The cylindrical metallic member 81 is structured by the body part 82, which includes regions around the valleys of the projecting parts 83 that come into contact with the outer periphery of the reduction shaft 28, the regions around the peaks of the projecting parts 83 that come into contact with the inner peripheral surface of the second rotor shaft 70, and the intermediate parts 84 that connect the body part 82 including the regions around the valleys of the projecting part 83, with the regions around the peaks of the projecting parts 83. Since the cylindrical metallic member 81 is provided between the reduction shaft 28 and the second rotor shaft 70 in the state where the intermediate parts 84 are compressed in the radial direction, the reduction shaft 28 and the second rotor shaft 70 receive reaction force in radially opposite directions from the cylindrical metallic member 81. Because of this, in the double-shaft type hybrid vehicle 12 in which the engine 16, the first electric motor MG1 and the differential mechanism 22 are arranged on a different rotation axis from that of the second electric motor MG2, misalignment between the axis of the reduction shaft 28 and the axis of the second rotor shaft 70 is restrained, and generation of tooth hitting sound is thus restrained. Moreover, when torque applied between the reduction shaft 28 and the second rotor shaft 70 is smaller than the given torque value, rotation is transmitted by the cylindrical metallic member 81. Further, since the cylindrical metallic member 81 has high rigidity and is restrained from being deformed in the rotation direction, a shift of a phase is restrained before and after damping torque outputted from the second electric motor MG2 is transmitted from the second rotor shaft 70 to the reduction shaft 28 during damping control that restrains rotation fluctuation of the engine 16. Thus, in the double-shaft type hybrid vehicle 12, a damping effect of the damping control is improved.

Further, in the power transmission structure 10 of a vehicle according to the first embodiment, the power transmission structure is structured by the reduction shaft 28, the second rotor shaft 70 of the second electric motor MG2, and the cylindrical metallic member 81 that is elastically deformable in the radial direction and press-fitted into the part where the reduction shaft 28 and the second rotor shaft 70 overlap each other in the radial direction, and the power transmission structure serves as the dynamic damper in which the rotor 46 of the second electric motor MG2 serves as a mass. A conversion value of the rotational speed of engine Nef converted from resonance frequency f of this power transmission structure is an upper limit of rotational speed Nemax of the engine 16 or higher. Therefore, the resonance frequency f of the power transmission structure 10 of a vehicle does not coincide with frequency in the normal rotation region of the engine 16. Thus, generation of resonance is restrained, and deterioration of drivability is restrained.

Next, the second embodiment of the invention is explained. In the explanation of the second embodiment below, the same reference numerals are used for parts having functions that are substantially common to those in the first embodiment, and detailed explanation is omitted.

Figure 10:
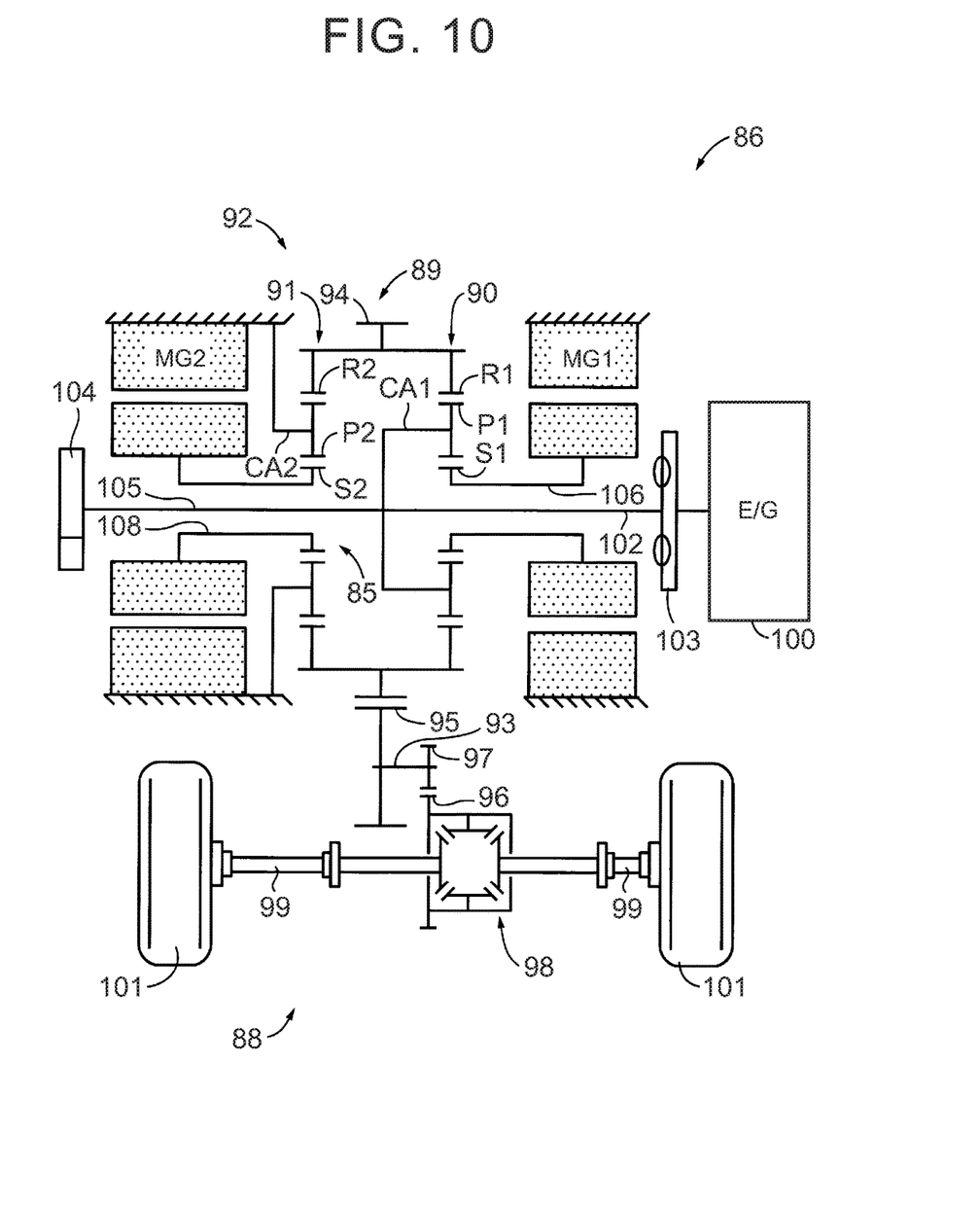
FIG. 10 is an outline view of a driving device to which a power transmission structure of a vehicle according to the second embodiment of the invention is applied.

FIG. 10 is an outline view of a driving device 88 for a hybrid vehicle (herein after, referred to as a "driving device 88") provided in a hybrid vehicle 86 to which a power transmission structure 85 of a vehicle according to the second embodiment is applied. In FIG. 10, the driving device 88 of the hybrid vehicle 86 is provided with a transmission part 92. The transmission part 92 has a power distribution mechanism (also referred to as a differential mechanism) 90, which distributes power outputted from an engine 100 serving as a drive power source for running to a first electric motor MG1 and an output member 89, a gear mechanism 91 connected with the output member 89, and a second electric motor MG2 connected with the output member 89 through the gear mechanism 91 so as to be able to transmit power. The driving device 88 is provided with a counter driven gear 95, which is fixed to a counter shaft 93 and meshes with an output gear 94 formed on an outer peripheral surface of the output member 89, a counter drive gear 97, which is fixed to the counter shaft 93 and meshes with the differential ring gear 96, a differential gear mechanism 98, and a pair of axles 99, and power of the engine 100 and the second electric motor MG2 is transmitted to a pair of driving wheels 101. In the driving device 88, the engine 100, a first electric motor MG1, and the power distribution mechanism 90 connected with the engine 100 and the first electric motor MG1 are arranged on the same rotation axis as the second electric motor MG2 and the gear mechanism 91 with which and the second electric motor MG2 is connected. Thus, the hybrid vehicle 86 is a single-shaft type hybrid vehicle.

One end of an input shaft 102 is connected with a crank shaft of the engine 100 through a damper device 103, and the other end of the input shaft 102 is connected with an oil pump driving shaft 105 that drives an oil pump 104.

Figure 11:
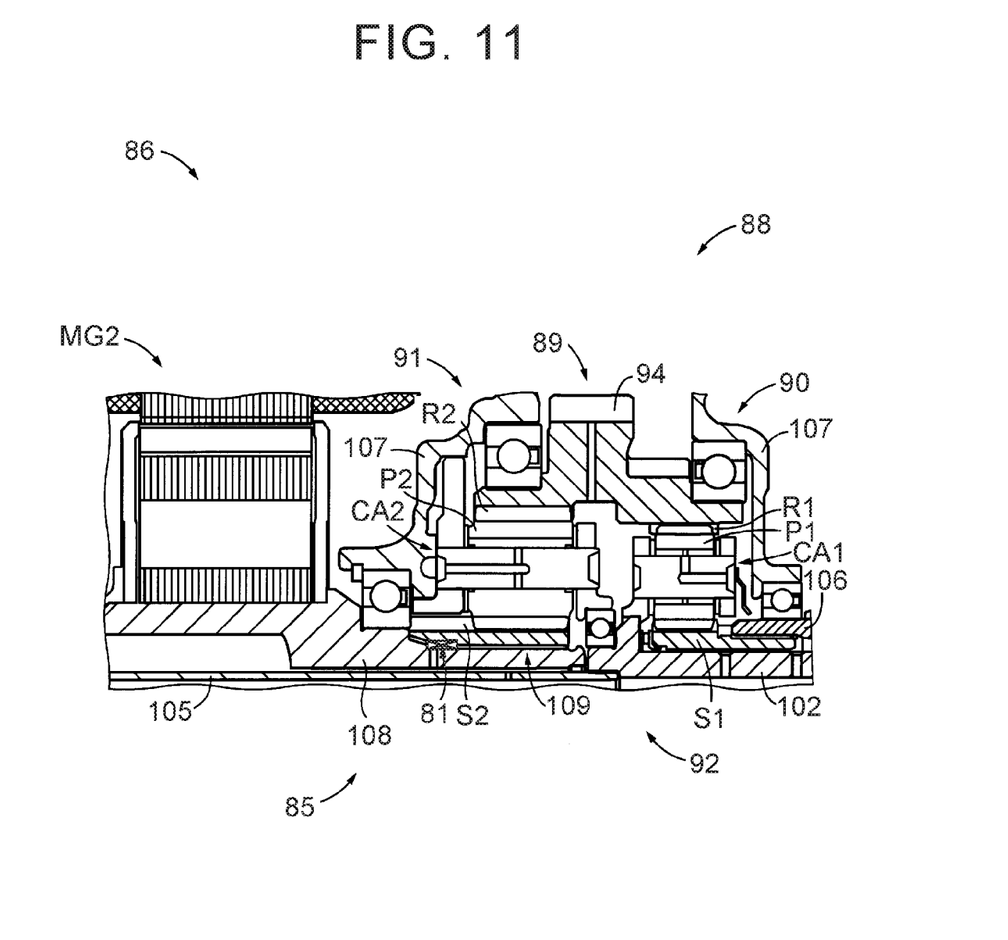
FIG. 11 is a sectional view of a power distribution mechanism, a gear mechanism, and a second electric motor of the driving device shown in FIG. 10.

FIG. 11 is a sectional view of the power distribution mechanism 90, the gear mechanism 91, and the second electric motor MG2 of the driving device 88. The power distribution mechanism 90 is structured by a publicly-known single-pinion type first planetary gear, which includes a first sun gear S1, a first pinion P1, a first carrier CA1 that supports the first pinion P1 so as to be able to rotate and revolve, and a first ring gear R1 meshing with the first sun gear S1 through the first pinion P1, as rotational elements (rotation members). The power distribution mechanism 90 functions as a differential mechanism that generates a differential action. In the power distribution mechanism 90, the first carrier CA1 is connected with the input shaft 102, namely, the engine 100, the first sun gear S1 is connected with a first rotor shaft 106 of the first electric motor MG1, the first ring gear R1 is formed on an inner peripheral surface of the output member 89. Since the first sun gear S1, the first carrier CA1, and the first ring gear R1 are able to mutually rotate relative to each other, an output of the engine 100 is distributed to the first electric motor MG1 and the output member 89.

The gear mechanism 91 is structured from a publicly-known single-pinion type second planetary gear, which is provided with a second sun gear S2, a second pinion P2, a second carrier CA2 that supports the second pinion P2 so as to be able to rotate and revolve, and a second ring gear R2 meshing with the second sun gear S2 through the second pinion P2 as rotational elements. In the gear mechanism 91, the second carrier CA2 is connected with a case 107, which is a non-rotation member, and rotation of the second carrier CA2 is thus inhibited. The second sun gear S2 is connected with a second rotor shaft 108 of the second electric motor MG2 by spline-fitting, and the second ring gear R2 is formed on the inner peripheral surface of the output member 89.

The power transmission structure 85 of a vehicle includes the second sun gear S2 and the second rotor shaft 108. The second sun gear S2 serves as a first rotor of the gear mechanism 91 connected with the output member 89 so as to be able to transmit power. The output member 89 serves as a power transmission member that transmits power of the engine 100 to the driving wheels 101 through the counter driven gear 95. The second rotor shaft 108 serves as a second rotor that is provided concentrically with the second sun gear S2 and spline-fitted to the second sun gear S2. The second sun gear S2 is a cylindrical member, and has an inner peripheral spline tooth on its inner peripheral surface. The oil pump driving shaft 105 is provided inside the second rotor shaft 108 concentrically, and a rotor of the second electric motor MG2 is provided on an outer peripheral surface of the second rotor shaft 108 so as not to be able to rotate relative to each other. Thus, power is transmitted from the second electric motor MG2 to the second rotor shaft 108. Further, the second rotor shaft 108 is provided with an outer peripheral spline tooth on the outer peripheral surface on the first planetary gear side. The second sun gear S2 and the second rotor shaft 108 are connected with each other by a spline fitting part 109 in which the inner peripheral spline tooth of the second sun gear S2 and the outer peripheral spline tooth of the second rotor shaft 108 mesh with each other. The power transmission structure 85 of a vehicle is provided with a cylindrical metallic member 81 that is press-fitted into a part where the inner peripheral surface of the second sun gear S2 and the outer peripheral surface of the second rotor shaft 108 face each other in the radial direction adjacent to the spline fitting part 109 so that the cylindrical metallic member 81 is able to deform elastically in the radial direction. The cylindrical metallic member 81 is provided between the second sun gear S2 and the second rotor shaft 108 in a state where intermediate parts 84 are compressed in the radial direction. Reaction force towards the inner periphery side from a body part 82 including regions around valleys of projecting parts 83 is always applied to the outer peripheral surface of the second rotor shaft 108, and reaction force towards the outer periphery side from regions around peaks of the projecting parts 83 is always applied to the inner peripheral surface of the second sun gear S2, thereby restraining misalignment between the axis of the second sun gear S2 and the axis of the second rotor shaft 108. Further, when torque acting between the second sun gear S2 and the second rotor shaft 108 is smaller than a given torque value due to friction force generated between cylindrical metallic member 81, and the inner peripheral surface of the second sun gear S2 and the outer peripheral surface of the second rotor shaft 108, torque is transmitted by the cylindrical metallic member 81. Thus, backlash between the second sun gear S2 and the second rotor shaft 108 is substantially eliminated. Also, rigidity of the cylindrical metallic member 81 is set in advance so that resonance frequency f of the power transmission structure 85 of a vehicle becomes an upper limit of rotational speed Nemax in a normal rotation region of the engine 100 or higher. The power transmission structure 85 of a vehicle is structured from the second sun gear S2, the second rotor shaft 108, and the cylindrical metallic member 81 that is elastically deformable in the radial direction and press-fitted into the part where the second sun gear S2 and the second rotor shaft 108 overlap each other in the radial direction.

As stated above, the power transmission structure 85 of a vehicle according to the second embodiment has the cylindrical metallic member 81 that is elastically deformable in the radial direction and press-fitted to the part where the second sun gear S2 and the second rotor shaft 108 of the second electric motor MG2 of the single-shaft type hybrid vehicle 86 overlap each other in the radial direction adjacent to the spline fitting part 109 between the second sun gear S2 and the second rotor shaft 108. Since the cylindrical metallic member 81 is provided between the second sun gear S2 and the second rotor shaft 108 in the state where the intermediate parts 84 are compressed in the radial direction, the second sun gear S2 and the second rotor shaft 108 receive reaction force in radially opposite directions from the cylindrical metallic member 81. Thus, in the single-shaft type hybrid vehicle 86 in which the engine 100, the first electric motor MG1, and the power distribution mechanism 90 are arranged on the same rotation axis as the second electric motor MG2 and the gear mechanism 91, misalignment between the axis of the second sun gear S2 and the axis of the second rotor shaft 108 is restrained, and generation of tooth hitting sound is thus restrained. Further, when torque applied between the second sun gear S2 and the second rotor shaft 108 is smaller than the given torque value, torque is transmitted by the cylindrical metallic member 81. At the same time, since rigidity of the cylindrical metallic member 81 is high and deformation in the rotation direction is thus restrained, a shift of a phase is restrained before and after damping torque is transmitted from the second rotor shaft 108 to the second sun gear S2. The damping torque is outputted from the second electric motor MG2 during damping control for restraining rotation fluctuation of the engine 100. Thus, in the single-shaft type hybrid vehicle 86, a damping effect of the damping control for restraining torque fluctuation generated during, for example, an expansion stroke of the engine 100 is improved.

Moreover, the power transmission structure 85 of a vehicle according to the second embodiment is made from the second sun gear S2, the second rotor shaft 108 of the second electric motor MG2, and the cylindrical metallic member 81 that is elastically deformable in the radial direction and press-fitted to the part where the second sun gear S2 and the second rotor shaft 108 overlap each other in the radial direction, and it is possible to consider the power transmission structure 85 as a power transmission structure that serves as a dynamic damper in which a rotor 46 of the second electric motor MG2 serves as a mass. An conversion value of the rotational speed of engine Nef, which is converted from resonance frequency f in this power transmission structure, is an upper limit of rotational speed Nemax of the engine 100 or higher. Therefore, the resonance frequency f of the power transmission structure 85 of a vehicle does not coincide with frequency in a normal rotation region of the engine 100. Hence, generation of resonance is restrained, and deterioration of drivability is also restrained.

Figure 12:
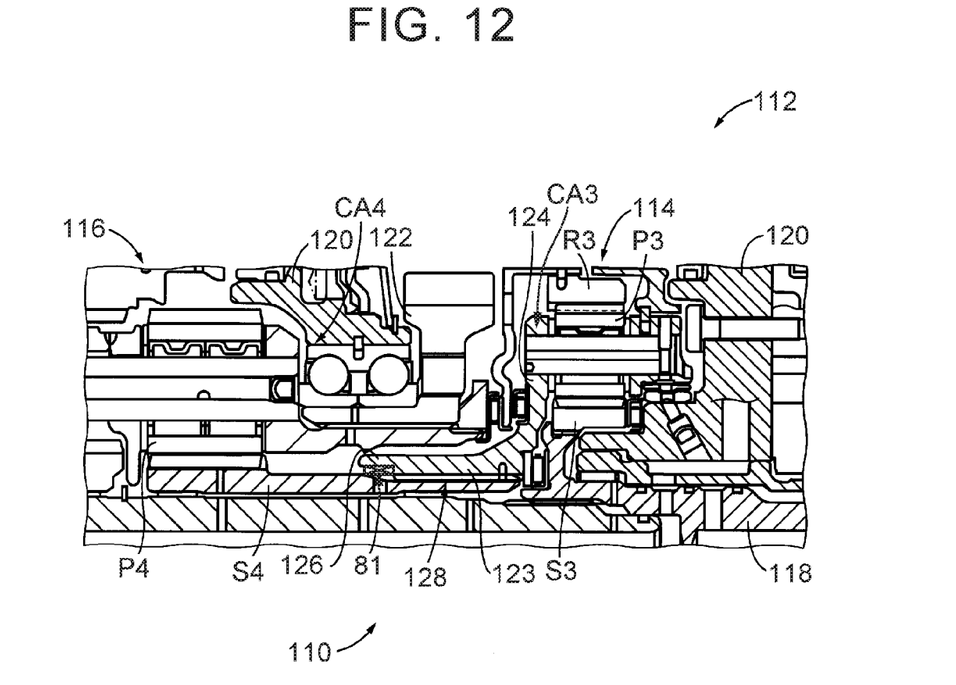
FIG. 12 is a sectional view of a main part of a driving device to which a power transmission structure of a vehicle according to the third embodiment of the invention is applied.

Next, the third embodiment of the invention is explained. FIG. 12 is a sectional view of a main part of a vehicle driving device 112 provided with a power transmission structure 110 of a vehicle according to the third embodiment. The vehicle driving device 112 is structured mainly by a first planetary gear 114 and a second planetary gear 116. The first planetary gear 114 is provided with a first sun gear S3, a first pinion P3, a first carrier CA3 that supports the first pinion P3 so as to be able to rotate and revolve, and a first ring gear R3 meshing with the first sun gear S3 through the first pinion P3 as rotational elements. The second planetary gear 116 is provided with a second sun gear S4, a second pinion P4, a second carrier CA4 that supports the second pinion P4 so as to be able to rotate and revolve, and a second ring gear meshing with the second sun gear S4 through the second pinion P4 as rotational elements. The first sun gear S3 is connected with an engine through an input shaft 118. The first carrier CA3 is connected with the second sun gear S4, and also selectively connected with a case 120, which is a non-rotation member, through a brake. The first ring gear R3 is selectively connected with the case 120 through the brake. The second carrier CA4 is connected with an output gear 122.

The power transmission structure 110 of a vehicle includes the first carrier CA3 and the second sun gear S4. The first carrier CA3 serves as a first rotor of the first planetary gear 114 that is connected with the input shaft 118 so as to be able to transmit power. The input shaft 118 functions as a power transmission member that transmits power of the engine. The second sun gear S4 serves as a second rotor that is provided concentrically with the first carrier CA3 and is spline-fitted to the first carrier CA3. The first carrier CA3 is provided with a cylindrical part 123, a disc-shaped support wall part 124, and a contact part 126. The disc-shaped support wall part 124 is provided on an end part of the cylindrical part 123 on the first planetary gear 114 side, and is one of two support wall parts that support both ends of a pinion shaft, respectively, the pinion shaft supporting the first pinion P3 so as to be able to rotate. The contact part 126 has an inner diameter that is increased by reducing a thickness of the cylindrical part 123 on the second planetary gear 116 side of the cylindrical part 123 continuously from the cylindrical part 123. The cylindrical part 123 has an inner peripheral spline tooth on its inner peripheral surface. The second sun gear S4 is a cylindrical member, and an outer peripheral spline tooth is formed on its outer peripheral surface on the first planetary gear 114 side. The first carrier CA3 and the second sun gear S4 are connected with each other by a spline fitting part 128 in which the inner peripheral spline tooth of the cylindrical part 123 of the first carrier CA3 and the outer peripheral spline tooth of the second sun gear S4 mesh with each other. The power transmission structure 110 of a vehicle is provided with a cylindrical metallic member 81. The cylindrical metallic member 81 is press-fitted to a part where the contact part 126 of the first carrier CA3 and the outer peripheral spline tooth formed on the outer peripheral surface of the second sun gear S4 face each other in the radial direction so that the cylindrical metallic member 81 is able to deform elastically. The cylindrical metallic member 81 is provided between the first carrier CA3 and the second sun gear S4 in a state where intermediate parts 84 are compressed in the radial direction. Thus, reaction force towards an inner periphery side from a body part 82 including regions around valleys of projecting parts 83 is always applied to the outer peripheral spline tooth on the outer peripheral surface of the second sun gear S4, and reaction force towards an outer periphery side from regions around peaks of the projecting parts 83 is always applied to the inner peripheral surface of the contact part of the first carrier CA3. Thus, misalignment between the axis of the first carrier CA3 and the axis of the second sun gear S4 is restrained. Further, when torque acting between the first carrier CA3 and the second sun gear S4 is smaller than a given torque value due to friction force generated between the cylindrical metallic member 81, and the inner peripheral surface of the contact part 126 of the first carrier CA3 and the outer peripheral spline tooth of the second sun gear S4, torque is transmitted by the cylindrical metallic member 81. Thus, backlash between the first carrier CA3 and the second sun gear S4 is substantially eliminated.

As stated above, the power transmission structure 110 of a vehicle according to the third embodiment has the cylindrical metallic member 81. The cylindrical metallic member 81 is elastically deformable in the radial direction and fitted to the part where the first carrier CA3 and the second sun gear S4, which is provided concentrically with the first carrier CA3, overlap each other in the radial direction adjacent to the spline fitting part 128 between the first carrier CA3 and the second sun gear S4. The first carrier CA3 is connected with the input shaft 118 so as to be able to transmit power, the input shaft 118 serving as a power transmission member that transmits power of the engine. Since the cylindrical metallic member 81 is provided between the first carrier CA3 and the second sun gear S4 in the state where intermediate parts 84 are compressed in the radial direction, the first carrier CA3 and the second sun gear S4 receive reaction force in radially opposite directions from the cylindrical metallic member 81. Thus, misalignment between the axis of the first carrier CA3 and the axis of the second sun gear S4 is restrained, and generation of tooth hitting sound is thus restrained. Further, when torque applied between the first carrier CA3 and the second sun gear S4 is smaller than the given torque value, torque is transmitted by the cylindrical metallic member 81. At the same time, since the cylindrical metallic member 81 has high rigidity, and is restrained from being deformed in the rotation direction, responsiveness of torque transmission between the first carrier CA3 and the second sun gear S4 is improved.

The invention has been explained in detail with reference to the graphs and drawings. However, the invention may be carried out in yet another forms, and various changes may be added without departing from the gist of the invention.

What is claimed is:

1. A power transmission structure of a vehicle, comprising:
a driving shaft connected with a power transmission member, the power transmission member being configured to transmit power of an engine,
a rotating shaft of an electric motor that is provided concentrically with the driving shaft, the rotating shaft being spline-fitted to the driving shaft; and
a metallic cylinder configured to be able to deform elastically in a radial direction, the metallic cylinder being interposed in a part where the driving shaft and the rotating shaft overlap each other in the radial direction, and the metallic cylinder having a first region, a second region, and a third region, in which the first region is in contact with the driving shaft, the second region is in contact with the rotating shaft, and the third region connects the first region and the second region with each other,
wherein resonance frequency of the power transmission structure, which is made from the driving shaft, the rotating shaft, and the metallic cylinder, becomes an upper limit of rotational speed of the engine or higher, in which the metallic cylinder is elastically deformable in the radial direction and interposed in a part where the driving shaft and the rotating shaft overlap each other in the radial direction.

2. The power transmission structure according to claim 1, wherein
the rotating shaft of the electric motor is a rotor shaft of a second electric motor of a hybrid vehicle in which the engine, a first electric motor, and a planetary gear connected with the engine and the first electric motor are arranged on a different rotation axis from a rotation axis of the second electric motor,
the driving shaft is a reduction shaft, and
the metallic cylinder is provided between the rotor shaft of the second electric motor of the hybrid vehicle and the reduction shaft.

* * * * *